US010011531B2

(12) United States Patent
Villard et al.

(10) Patent No.: US 10,011,531 B2
(45) Date of Patent: *Jul. 3, 2018

(54) PROCESS TO INERT NON-SWELLING CLAYS

(75) Inventors: Emmanuel Villard, Saint-Christo-en-Jarez (FR); Olivier Watt, Saint Jean de Soudain (FR); Horacio Naranjo, Jardin (FR); David Rinaldi, Lyons (FR); Alain Jacquet, Saint-Didier de Formans (FR)

(73) Assignee: LAFARGE, Paris (FR)

( * ) Notice: Subject to any disclaimer, the term of this patent is extended or adjusted under 35 U.S.C. 154(b) by 482 days.

This patent is subject to a terminal disclaimer.

(21) Appl. No.: 13/582,138

(22) PCT Filed: Mar. 1, 2011

(86) PCT No.: PCT/FR2011/050418
§ 371 (c)(1),
(2), (4) Date: Sep. 13, 2012

(87) PCT Pub. No.: WO2011/107704
PCT Pub. Date: Sep. 9, 2011

(65) Prior Publication Data
US 2013/0035417 A1 Feb. 7, 2013

(30) Foreign Application Priority Data
Mar. 2, 2010 (FR) ..................... 10 51486

(51) Int. Cl.
C04B 24/26 (2006.01)
C04B 28/02 (2006.01)
C04B 14/10 (2006.01)
C04B 20/02 (2006.01)
C04B 103/32 (2006.01)

(52) U.S. Cl.
CPC ............. C04B 28/02 (2013.01); C04B 14/10 (2013.01); C04B 20/023 (2013.01); C04B 24/2623 (2013.01); C04B 2103/32 (2013.01)

(58) Field of Classification Search
CPC ... C04B 24/02; C04B 24/2623; C04B 14/106; C04B 14/10; C04B 28/02
USPC ........................................................ 523/401
See application file for complete search history.

(56) References Cited

U.S. PATENT DOCUMENTS

| 3,725,312 | A | | 4/1973 | Panzer et al. | |
| 3,738,945 | A | * | 6/1973 | Panzer et al. | 528/405 |
| 4,159,302 | A | * | 6/1979 | Greve | C04B 28/14 |
| | | | | | 106/675 |
| 4,471,100 | A | * | 9/1984 | Tsubakimoto et al. | 525/367 |
| 5,118,751 | A | * | 6/1992 | Schulze | C04B 24/26 |
| | | | | | 524/269 |
| 5,292,441 | A | * | 3/1994 | Chen et al. | 210/735 |
| 5,393,343 | A | * | 2/1995 | Darwin et al. | 106/808 |
| 5,498,665 | A | * | 3/1996 | Schulze | C04B 24/22 |
| | | | | | 106/654 |
| 5,614,017 | A | | 3/1997 | Shawl | |
| 5,731,259 | A | | 3/1998 | Palumbo et al. | |
| 6,166,113 | A | * | 12/2000 | Haerzschel | C04B 24/2623 |
| | | | | | 524/4 |
| 6,352,952 | B1 | * | 3/2002 | Jardine et al. | 501/141 |
| 6,670,415 | B2 | | 12/2003 | Jardine et al. | |
| 8,257,490 | B2 | * | 9/2012 | Alain et al. | 106/802 |
| 8,349,960 | B2 | * | 1/2013 | Gaeberlein et al. | 525/212 |
| 8,425,680 | B2 | * | 4/2013 | Jacquet et al. | 106/802 |
| 8,466,224 | B2 | | 6/2013 | Georges et al. | |
| 8,685,156 | B2 | * | 4/2014 | Koyata et al. | 106/718 |
| 8,834,626 | B2 | * | 9/2014 | Jacquet et al. | 106/802 |
| 2006/0100355 | A1 | * | 5/2006 | Waser | C04B 24/383 |
| | | | | | 524/556 |
| 2009/0029105 | A1 | * | 1/2009 | Masukawa | B01D 39/2086 |
| | | | | | 428/116 |
| 2009/0030168 | A1 | * | 1/2009 | Schorm et al. | 526/201 |
| 2009/0151602 | A1 | * | 6/2009 | Francis | C04B 28/14 |
| | | | | | 106/675 |
| 2009/0298973 | A1 | * | 12/2009 | Watanabe | C04B 28/02 |
| | | | | | 524/4 |
| 2009/0326159 | A1 | * | 12/2009 | Ikeda et al. | 525/296 |
| 2010/0190888 | A1 | * | 7/2010 | Gaeberlein et al. | 524/5 |
| 2010/0197853 | A1 | * | 8/2010 | Sugaya | 524/557 |
| 2013/0035417 | A1 | * | 2/2013 | Villard et al. | 523/401 |

FOREIGN PATENT DOCUMENTS

| EP | 0 056 627 B1 | 10/1984 |
| EP | 0 471 597 A1 | 2/1992 |
| EP | 2 065 349 A1 | 6/2009 |
| EP | 2 072 531 A1 | 6/2009 |
| EP | 2 090 620 A1 | 8/2009 |
| FR | 1 042 084 A | 10/1953 |
| FR | 2 875 496 A1 | 3/2006 |
| GB | 508929 | 7/1939 |
| JP | 58-74552 | 5/1983 |
| JP | 2006-045010 A | 2/2006 |
| WO | WO 98/58887 | 12/1998 |
| WO | WO 2006/032785 A2 | 3/2006 |
| WO | WO 2006/032786 A2 | 3/2006 |

(Continued)

OTHER PUBLICATIONS

International Search Report for PCT/FR2011/050418.
Bon, R., "What do we Mean by Building Technology?" Habitat International, vol. 15, No. 1/2, pp. 3-26 (1991).

*Primary Examiner* — Michael M Dollinger
(74) *Attorney, Agent, or Firm* — Pillsbury Winthrop Shaw Pittman LLP

(57) ABSTRACT

A process to inert non-swelling clays in at least one mineral component intended for the preparation of a hydraulic composition, including the addition, to the hydraulic composition, to the mineral component or to one of the other constituents of the hydraulic composition, of an organic molecule having a cationic charge density strictly less than 0.5 meq/g and including at least two atoms each being capable of forming at least one hydrogen bond.

20 Claims, No Drawings

(56) References Cited

FOREIGN PATENT DOCUMENTS

| WO | WO 2009/052362 A2 | 4/2009 |
| WO | WO 2010/005117 | 1/2010 |
| WO | WO 2010/040915 A2 | 4/2010 |

* cited by examiner

PROCESS TO INERT NON-SWELLING CLAYS

CROSS-REFERENCE TO RELATED APPLICATIONS

This is the U.S. National Stage of PCT/FR2011/050418, filed Mar. 1, 2011, which in turn claims priority to French Patent Application No. 10/51486, filed Mar. 2, 2010, the entire contents of both applications are incorporated herein by reference in their entireties.

The present invention relates to a process to inert clays in hydraulic compositions.

It is sometimes difficult to uniformly control the properties of hydraulic compositions. The quality of the starting materials is often the cause of these variations.

In particular, it has been found that sands or mineral admixtures can bring about fluctuations in the properties of hydraulic compositions. In some cases, these fluctuations are due to a decrease in the effectiveness of superplasticizers corresponding to polymers with a comb structure.

According to the document WO 98/58887, the absorption of these polymers by type 2:1 swelling clays present in sands is responsible for this decrease in effectiveness. The document WO 98/58887 provides for the use of agents which modify the activity of the swelling clays, for example by reducing their absorption capacity or by carrying out a pre-absorption process. The document WO 98/58887 provides, among other uses, for that of inorganic or organic cations.

However, generally, the clays present in sands and/or mineral admixtures comprise not only swelling clays but also comprise non-swelling clays and, contrary to what is indicated in the document WO 98/58887, non-swelling clays, for example of 1:1 type, can also bring about a decrease in the quality of the hydraulic compositions.

The aim of the present invention is thus to provide a process for the preparation of hydraulic compositions useful to reduce the undesirable effects relating to the presence of non-swelling clays. In particular, manufacturers are looking for a process which is simple, fast, reliable and relatively inexpensive and which does not require sophisticated equipment.

This aim is achieved by the use of specific agents. Thus, the present invention relates to a process to inert non-swelling clays in at least one mineral component intended for the preparation of a hydraulic composition, comprising the addition, to the hydraulic composition, to the mineral component or to one of the other constituents of the hydraulic composition, of an organic molecule having a cationic charge density of strictly less than 0.5 meq/g and comprising at least two atoms each being capable of forming at least one hydrogen bond.

The present invention also relates to a mixture to inert non-swelling clays in at least one mineral component intended for the preparation of a hydraulic composition, comprising at least one organic molecule having a cationic charge density of strictly less than 0.5 meq/g and comprising at least two atoms each being capable of forming at least one hydrogen bond.

The inerting agents according to the invention offer at least one of the following advantages:

the hydraulic compositions obtained by the process according to the invention require a lower dosage of superplasticizer than that necessary for a hydraulic composition obtained from the same mineral component in the same proportions but without an inerting agent according to the invention, for an identical consistency or fluidity;

the hydraulic compositions obtained by the process according to the invention require a total amount of water lower than that necessary for a hydraulic composition obtained from the same mineral component in the same proportions but without an inerting agent according to the invention, for an identical consistency or fluidity;

the inerting agents are effective with different non-swelling clays;

the inerting agents do not alter with the characteristics of the hydraulic composition in the event of overdosage;

the inerting agents do not alter with the short-term or long-term mechanical strengths of the hydraulic composition; and the inerting agents do not exhibit a set-retarding effect on the hydraulic composition.

Finally, the invention has in addition the advantage of being able to be used in at least one industry, for example the building industry, the chemical industry (adjuvant producers), the cement industry, ready-mix concrete plants, plants for the production of plaster or for the manufacture of objects made of plaster and/or in at least one of the construction markets (building, civil engineering, roads or prefabrication factory).

Other advantages and characteristics of the invention will become clearly apparent on reading the description and examples, given purely by way of illustration and without implied limitation, which will follow.

The expression "hydraulic binder" is to be understood, according to the present invention, as any compound having the property of hydrating in the presence of water and the hydration of which makes it possible to obtain a solid having mechanical characteristics. The hydraulic binder according to the invention can in particular be a cement, plaster or lime. Preferably, the hydraulic binder according to the invention is a cement.

The expression "hydraulic composition" is to be understood, according to the present invention, as a mixture of at least one hydraulic binder with water ("mixing water"), optionally aggregates, optionally additives and optionally mineral admixtures. A hydraulic composition can, for example, be a high-performance concrete, a very-high-performance concrete, a self-placing concrete, a self-levelling concrete, a self-compacting concrete, a fibre-reinforced concrete, a ready-mix concrete or a coloured concrete. The term "concrete" is also to be understood as concretes which have been subjected to a finishing operation, such as bush-hammered concrete, deactivated concrete or polished concrete. This definition is also understood to mean prestressed concrete. The term "concrete" comprises mortars; in this precise case, the concrete comprises a mixture of at least one hydraulic binder, sand, water, optionally additives and optionally mineral additions. The term "concrete" according to the invention denotes without distinction fresh concrete or hardened concrete. Preferably, the hydraulic composition according to the invention is a cement slurry, a mortar, a concrete, a plaster slurry or a lime slurry. Preferably, the hydraulic composition according to the invention is a cement slurry, a mortar or a concrete. The hydraulic composition according to the invention can be used directly on a building site in the fresh state or poured into a formwork suitable for the targeted application, or in a prefabrication factory, or as coating on a solid support.

The term "sand" is to be understood, according to the present invention, to define aggregates with a mean particle size strictly greater than 0 mm and less than or equal to 6 mm, preferably varying from 0 to 4 mm. They can be of any mineral nature, for example calcareous, siliceous or siliceous/calcareous or other. This definition also includes fillers or other specific inorganic materials which may be present in hydraulic compositions.

The expression "mineral admixtures" is to be understood, according to the present invention, as a finely divided mineral material used in the concrete or the cement in order to improve certain properties or to confer specific properties on it. They are, for example, fly ash (as defined in the "Cement" standard NF EN 197-1, section 5.2.4, or as defined in the "Concrete" standard EN 450), pozzolanic materials (as defined in the "Cement" standard NF EN 197-1, section 5.2.3), silica fume (as defined in the "Cement" standard NF EN 197-1, section 5.2.7, or as defined in the "Concrete" standard prEN 13263:1998 or NF P 18-502), slags (as defined in the "Cement" standard NF EN 197-1, section 5.2.2, or as defined in the "Concrete" standard NF P 18-506), calcined shale (as defined in the "Cement" standard NF EN 197-1, section 5.2.5), calcareous additions (as defined in the "Cement" standard NF EN 197-1, section 5.2.6, or as defined in the "Concrete" standard NF P 18-508) and siliceous additions (as defined in the "Concrete" standard NF P 18-509), or mixtures thereof.

The term "clays" is to be understood to denote, according to the present invention, aluminum silicates and/or magnesium silicates, in particular phyllosilicates with a layered structure, the layers typically having a separation of approximately 7 to approximately 14 Angstroms. In the sands, montmorillonite, illite, kaolinite, muscovite and chlorites are encountered in particular. The clays can be of 2:1 type but also of 1:1 type (kaolinite) or of 2:1:1 type (chlorites).

The term "swelling clays" is to be understood to denote, according to the present invention, the clays which have cations in their interlayer spaces capable of hydrating in the presence of water (vapour or liquid). Swelling clays, generically referred to as smectites, comprise in particular clays of 2:1 type, such as montmorillonite.

The term "non-swelling clays" is to be understood, according to the present invention, as clays having an interlayer space which does not increase in the presence of water. Non-swelling clays comprise in particular clays of 1:1 type (in particular kaolinite) or of 2:1:1 type (in particular chlorites).

The term "inerting of clay" is to be understood to denote, according to the present invention, the at least partial neutralization of the harmful effects due to the presence of the clay in a hydraulic composition, in particular a hydraulic composition comprising a superplasticizer.

The expression "component for the construction field" is to be understood, according to the present invention, as any constituent component of a construction, such as, for example, a floor, screed, foundation, wall, partition, ceiling, beam, worktop, pillar, bridge pier, block, pipe, post, cornice, road system component (for example a pavement kerb), roof tile, surfacing (for example road or wall surfacing), plasterboard or insulating component (sound and/or thermal insulating component).

The term "intrinsic viscosity" is to be understood to denote, according to the present invention, the limiting value of the viscosity reduced to infinite dilution of the polymer. This value is correlated with the average molecular weight of a polymer.

The term "hydrogen bond" or "hydrogen bridge" is to be understood to denote, according to the present invention, a non-covalent physical bond, of dipole-dipole type, of low strength (twenty times weaker than a conventional covalent bond), which connects molecules and which comprises a hydrogen atom. It requires a hydrogen bond donor and a hydrogen bond acceptor. The donor is composed of a compound comprising an acid H, that is to say a heteroatom (for example nitrogen, oxygen or sulphur) carrying a hydrogen atom (as in amines, alcohols or thiols). The acceptor is composed of a heteroatom (solely nitrogen, oxygen or sulphur) carrying lone pairs.

The term "atom of an organic molecule capable of forming a hydrogen bond" is to be understood to denote, according to the present invention, a hydrogen atom or an electronegative atom, for example nitrogen, oxygen or sulphur, of the organic molecule according to the invention capable of forming at least one hydrogen bond.

The invention is based on the observation that organic molecules having a cationic charge density strictly less than 0.5 meq/g and comprising at least two atoms each being capable of forming at least one hydrogen bond are particularly effective to inert non-swelling clays.

More specifically, the invention provides a process to inert non-swelling clays in at least one mineral component intended for the preparation of a hydraulic composition, said hydraulic composition comprising several constituents, the mineral component being one of the constituents, and additionally comprising a superplasticizer comprising a polymer with a comb structure. The process comprises the addition, to the hydraulic composition, to the mineral component or to one of the other constituents of the hydraulic composition, of an organic molecule having a cationic charge density of strictly less than 0.5 meq/g and comprising at least two atoms each being capable of forming at least one hydrogen bond, the organic molecule being suitable for reducing adsorption of the superplasticizer with a comb structure by the non-swelling clays. In the continuation of the description, the organic molecule is referred to as inerting agent for non-swelling clays.

According to the invention, the process can additionally comprise the addition, to the hydraulic composition, to the mineral component or to one of the other constituents of the hydraulic composition, of an additional polymer having a cationic charge density of greater than 0.5 meq/g and an intrinsic viscosity of less than 1 dl/g, resulting in the inerting of swelling clays in the sands and/or mineral admixtures. In the continuation of the description, the additional cationic polymer is referred to as inerting agent for swelling clays. More specifically, the process can also relate to the inerting of swelling clays in the mineral component and can comprise the addition, to the hydraulic composition, to the mineral component or to one of the other constituents of the hydraulic composition, of an additional cationic polymer having a cationic charge density of greater than 0.5 meq/g and an intrinsic viscosity of less than 1 dl/g, the cationic polymer being suitable for reducing the adsorption of the superplasticizer with a comb structure by the swelling clays.

According to an embodiment of the invention, the mineral component corresponds to sand, to mineral additions and/or to a hydraulic binder, in particular cement or plaster.

Inerting Agent for Non-Swelling Clays

According to an embodiment of the invention, the inerting agent for non-swelling clays is water-soluble.

According to an embodiment of the invention, the inerting agent for non-swelling clays is a neutral organic molecule.

According to an embodiment of the invention, the inerting agent for non-swelling clays is a polymer having a molecular weight less than 1 000 000 g/mol, preferably less than 500 000 g/mol, more preferably less than 100 000 g/mol and most preferably less than 50 000 g/mol.

According to an embodiment of the invention, the inerting agent for non-swelling clays comprises at least ten atoms, preferably at least 50 atoms and more preferably at least 100 atoms, each being capable of forming at least one hydrogen bond.

According to an embodiment of the invention, the inerting agent for non-swelling clays is a polymer or a copolymer comprising at least one monomer having at least one atom capable of forming at least one hydrogen bond.

According to an embodiment of the invention, the inerting agent for non-swelling clays is chosen from the group consisting of an oxyalkylene (for example ethylene glycol and/or propylene glycol or PEG), a crown ether, a polyvinyl alcohol, a gluconate, a heptagluconate, a heptagluconic acid, a gluconic acid, a polysaccharide, in particular cellulose or chitin, dextrin, cellulose derivatives, chitosan, alginates, hemicellulose, pectin, polyols or proteins or a mixture of these compounds.

Preferably, the inerting agent for non-swelling clays is a polyvinyl alcohol or PVA. By way of example, the PVA is obtained by partial hydrolysis of a polyvinyl acetate polymer.

Preferably, the inerting agent for non-swelling clays does not additionally have a set-retarding effect, in particular as is defined in the "Concrete" standard EN 934-2, entitled "Adjuvants pour béton, mortier et coulis—Partie 2—Adjuvants pour béton—Définitions, exigences, conformité, marquage et étiquetage" [Adjuvants for concrete, mortar and grout—Part 2—Adjuvants for concrete—Definitions, requirements, conformity, marking and labelling].

Preferably, the inerting agent for non-swelling clays does not additionally have the effect of a plasticizer/water-reducer, in particular as is defined in the "Concrete" standard EN 934-2.

According to an embodiment of the invention, the inerting agent for non-swelling clays comprises hydroxyl functional groups.

According to an embodiment of the invention, the inerting agent for non-swelling clays additionally has a molecular weight expressed by an intrinsic viscosity of less than 1 dl/g, preferably of less than 0.8 dl/g and in particular of less than 0.6 dl/g.

According to embodiment of the invention, the inerting agent for non-swelling clays is obtained by a stage of polymerization of at least one vinyl acetate monomer or of an analogous compound and a stage of hydrolysis, the degree of hydrolysis of the organic molecule being less than 95%, preferably less than 94% and more preferably less than 93%.

According to an embodiment of the invention, the inerting agent for non-swelling clays preferably has a linear structure.

Superplasticizer

Preferably, the hydraulic composition further comprises a superplasticizer.

The term "superplasticizer" is to be understood, according to the present invention, as an organic molecule used in the field of hydraulic compositions in order to fluidize the hydraulic compositions or to reduce the dosage of water for an equal consistency. A superplasticizer according to the present invention can, for example, be a polymer with a comb structure, for example a PPC, a lignosulphonate, a polyoxyalkylene diphosphonate or mixtures thereof.

The term "PPC" is to be understood, according to the present invention, as a copolymer comprising at least one unit of formula (I):

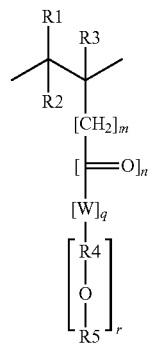

and at least one unit of formula (II):

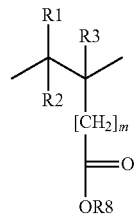

where R1, R2 and R3 independently represent a hydrogen atom, a linear or branched $C_1$ to $C_{20}$ alkyl radical, a phenyl radical or a —COOR8 radical with R8 independently representing a hydrogen atom, a linear or branched $C_1$ to $C_4$ alkyl radical, or a monovalent, divalent or trivalent ion or a quaternary ammonium radical;

R4 represents a linear or branched $C_2$ to $C_{20}$ alkyl radical;

R5 is a hydrogen atom, or a $C_1$ to $C_{20}$ alkyl group, or a monovalent, divalent or trivalent ion or a quaternary ammonium radical;

or R5 represents a radical of formula:

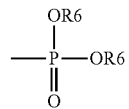

where R6 independently represents a hydrogen atom, a linear or branched $C_1$ to $C_{20}$ alkyl radical, or a monovalent, divalent or trivalent ion or a quaternary ammonium radical;

or R5 represents a radical of formula:

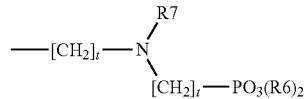

with R7 representing a hydrogen atom, a linear or branched $C_1$ to $C_{18}$ alkyl radical or a radical of formula:

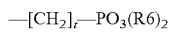

where W independently represents an oxygen or nitrogen atom or an NH radical;

m is an integer from 0 to 2;

n is an integer equal to 0 or 1;

q is an integer equal to 0 or 1;
r is an integer from 0 to 500;
t is an integer from 0 to 18;
and the molar mass of the said copolymer is from 10 000 to 400 000 daltons.

The integer m of the unit (I) and the integer m of the unit (II) are independent and can be identical or different.

The integers t of the radical R5 of the unit (I) can be identical or different.

The radicals R1, R2, R3 and R4 (I) and W of the unit (II) are independent and can be identical or different.

Preferably, a radical R1 represents a hydrogen atom.
Preferably a radical R2 represents a hydrogen atom.
Preferably, a radical R3 represents a methyl radical.
Preferably, a radical R4 represents an ethyl radical.
Preferably, the copolymer used according to the invention or one of its salts has an integer r from 1 to 300, preferably from 20 to 250, more preferably from 40 to 200 and most preferably from 40 to 150.

The copolymer can comprise several different units according to the formula (I) having in particular different radicals R5.

Preferably, the superplasticizer according to the present invention is chosen from those most effective in reducing the viscosity of hydraulic compositions.

Preferably, the superplasticizer according to the present invention has a molecular weight of less than 200 000 g/mol, preferably of less than 100 000 g/mol and more preferably of less than 80 000 g/mol.

The superplasticizer according to the invention can have a linear, branched, comb or star structure.

Preferably, the inerting agent for non-swelling clays and/or the inerting agent for swelling clays and/or the superplasticizer have a comb structure.

Very particularly preferred is a superplasticizer having a comb structure. In this case, the main chain is generally a hydrocarbon chain.

The superplasticizer according to the invention can comprise in particular carboxylic, sulphonic or phosphoric groups.

The superplasticizer according to the invention can furthermore comprise non-ionic side groups, in particular polyether groups. The polyether groups generally comprise ethylene oxide or propylene oxide units or a combination of the two.

The superplasticizer according to the invention can also comprise side groups of di- or oligosaccharide type (see, for example, Patent Application EP 2 072 531) or of polyamine-polyamide type (see, for example, Patent Application EP 2 065 349).

Many superplasticizers as described are known per-se.

They can be obtained directly by copolymerization, a process described in Patents EP 0,056,627, JP 58,074,552 and U.S. Pat. No. 5,393,343.

They can also be prepared by post-synthetic modification of a polymer, as described, for example, in U.S. Pat. No. 5,614,017.

The superplasticizer according to the invention can be added at different moments in the manufacturing process, for example at the same time as the inerting agent for non-swelling clays or as the inerting agent for swelling clays according to the invention or separately from the inerting agent for non-swelling clays or from the inerting agent for swelling clays according to the invention. It can be mixed with the hydraulic binder. According to a variant, it can be added at the moment of the preparation of the hydraulic composition according to the invention. Preferably, the superplasticizer is added after the inerting agent for swelling clays and/or after the inerting agent for non-swelling clays.

Inerting Agent for Swelling Clays

According to an embodiment of the invention, the inerting agent for swelling clays is water-soluble.

According to an embodiment of the invention, the inerting agent for swelling clays has a cationicity greater than 0.5 meq/g, preferably greater than 1 meq/g and more preferably greater than 2 meq/g.

According to an embodiment of the invention, the inerting agent for swelling clays additionally has a molecular weight expressed by an intrinsic viscosity less than 1 dl/g, preferably less than 0.8 dl/g and more preferably less than 0.6 dl/g.

The inerting agent for swelling clays can be a polymer having a linear, comb or branched structure. Preferably, the inerting agent for swelling clays is a polymer comprising a linear or slightly branched structure.

The cationic groups of the inerting agent for swelling clays can in particular be phosphonium, pyridinium, sulphonium and quaternary amine groups, the latter being preferred. The agent for swelling clays can be a polymer comprising a main chain and side groups. These cationic groups can be located on the main chain of the inerting agent for swelling clays or on the side groups.

The inerting agent for swelling clays corresponds, for example, to the cationic polymers described in Patent Application WO2006032785.

The inerting agent for swelling clays can be obtained directly by a known polymerization process, such as radical polymerization, polycondensation or polyaddition.

It can also be prepared by post-synthetic modification of a polymer, for example by grafting groups carrying at least one cationic functional group to a polymeric chain carrying appropriate reactive groups.

The polymerization is carried out starting from at least one monomer carrying a cationic group or a suitable precursor.

The inerting agents for swelling clays obtained from monomers carrying amine and imine groups are particularly useful. The nitrogen can be quaternized after polymerization in a known way, for example by alkylation using an alkylating compound, for example by methyl chloride, or in an acidic medium by protonation.

The inerting agents for swelling clays comprising quaternary amine cationic groups are particularly appropriate.

The monomers already carrying a cationic quaternary amine functional group can be, for example, diallyldialkylammonium salts, quaternized dialkylaminoalkyl(meth)acrylates and (meth)acrylamides N-substituted by a quaternized dialkylaminoalkyl.

The polymerization can be carried out with non-ionic monomers, preferably comprising a short chain, comprising from 2 to 6 carbon atoms. Anionic monomers can also be present, provided that the polymer finally obtained remains cationicoverall.

In the context of the modification of polymers by grafting, mention may be made of grafted natural polymers, for example cationic starches.

Advantageously, the inerting agent for swelling clays comprises groups, the cationic nature of which only appears in an acidic medium. Tertiary amine groups, which are cationic by protonation in an acidic medium, are particularly preferred. The absence of an ionic nature in hydraulic compositions of concrete or mortar type having an alkaline pH makes it possible to improve even more their robustness in comparison with other ionic compounds, in particular anionic compounds.

Mention may be made, by way of example, of cationic polymers of the family of the polyvinylamines. They can be obtained by polymerization of N-vinylformamide, followed by hydrolysis. The quaternized polyvinylamines can be prepared as described in U.S. Pat. No. 5,292,441. The polymers of the polyethyleneimine type are also appropriate. The latter are quaternized by protonation.

The cationic polymers obtained by polycondensation of epichlorohydrin with a mono- or dialkylamine, in particular methylamine or dimethylamine, are particularly preferred. Their preparation has been described, for example, in U.S. Pat. No. 3,738,945 and U.S. Pat. No. 3,725,312.

The unit of the cationic polymer obtained by polycondensation of dimethylamine and epichlorohydrin can be represented as follows:

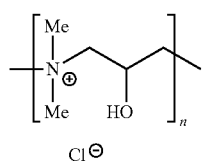

The polymers of the polyacrylamide type modified by Mannich reaction, for example polyacrylamide N-substituted by a dimethylaminomethyl group, are also appropriate.

The inerting agents for swelling clays obtained by polycondensation of dicyandiamide and formaldehyde are also appropriate. These polymers and their process of preparation are described in Patent FR 1,042,084.

According to a preferred embodiment, the inerting agent for swelling clays is obtainable by condensation of dicyandiamide with formaldehyde in the presence of:

A) a polyalkylene glycol; and/or
B) a polyalkoxylated polycarboxylate, also known as PPC; and/or
C) an ammonium derivative.

The exact chemical composition of the inerting agent for swelling clays thus obtained is not known with accuracy. It will thus be described below essentially by means of its process of preparation.

Process of Preparation of the Inerting Agent for Swelling Clays

The inerting agent for swelling clays is obtainable by condensation of dicyandiamide with formaldehyde, optionally in the presence of other compounds, in particular of a polyalkylene glycol (A), of a polyalkoxylated polycarboxylate (B) and/or of a quaternization agent (C).

The condensation reaction between dicyandiamide and formaldehyde requires 2 mol of formaldehyde per 1 mol of dicyandiamide, according to the following possible reaction scheme (1):

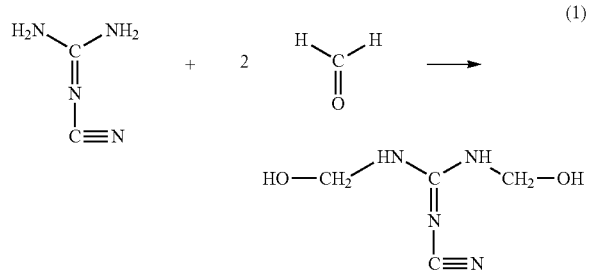

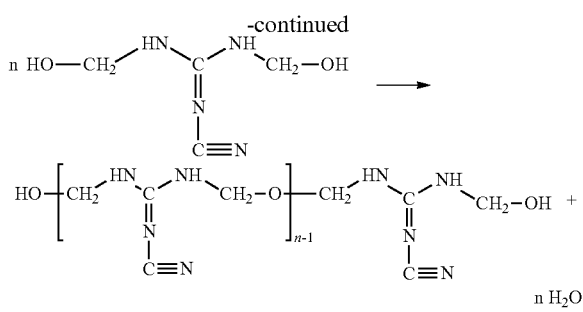

Thus, the molar ratio of formaldehyde to dicyandiamide is preferably located within the range from 0.8:1 to 4:1, in particular from 1:1 to 3:1. A molar excess greater than 4 does not provide any additional advantage but may result in an undesirable general setting.

Preferably, the reaction is carried out with a slight stoichiometric excess of formaldehyde, with a molar ratio of formaldehyde to dicyandiamide located within the range from 2.2:1 to 2.8:1.

Preferably, the inerting agent for swelling clays is obtained by condensation of formaldehyde with dicyandiamide in the presence of additional compounds. This is because this makes it possible to vary the properties of the inerting agent for swelling clays, in particular its solubility in water and its affinity for swelling clays.

The polyalkylene glycol (compound A) is preferably a compound of formula (III):

$$R9-O-[R10-O]_n-R11 \quad (III)$$

in which:

R10 is a $C_1$ to $C_4$ alkyl group, preferably an ethyl and/or propyl group;

R9 and R11 are, independently of one another, a hydrogen atom or a $C_1$ to $C_4$ alkyl group, preferably a methyl group; and n is a number from 25 to 1000.

By way of example, it can be polyethylene glycol, polypropylene glycol, an ethylene oxide/propylene oxide copolymer or a mixture of these different compounds. Preferably, it is polyethylene glycol.

The molecular weight of compound A is preferably from 1000 to 35 000.

The inventors have shown, by viscosity measurements, that the presence of compound A modifies the structure of the inerting agent for swelling clays as well as its performance.

The amount of compound A used in the reaction, if necessary, is less than that of the main reactants dicyandiamide and formaldehyde.

Thus, the reaction mixture generally comprises from 0 to 10%, preferably from 0.5 to 3% and most particularly from 0.8 to 1% by mass of compound A.

Compound B is a PPC as defined above in connection with the formulae (I) and (II).

Advantageously, the reaction mixture contains from 0.1 to 10%, preferably from 0.5 to 5% and most particularly from 0.5 to 2% by mass of compound B.

The ammonium derivative (compound C) has as main role that of increasing the ionic nature of the polymer by introducing cationic functional groups. The ionic nature of the polymer contributes greatly to its solubility in water and to its affinity for swelling clays and is thus advantageous for the envisaged application.

Preferably, the ammonium ion of the ammonium derivative is of following formula (IV):

$$NH(R12)_3^+ \qquad (IV)$$

in which:

the R12 groups are identical or different and correspond to H or to a $C_1$ to $C_6$ alkyl group.

Mention may be made, as examples of appropriate ammonium derivatives, of ammonium halides, for example ammonium chloride, ammonium bromide and ammonium iodide, ammonium sulphate, ammonium acetate, ammonium formate, ammonium nitrate or ammonium phosphate, ammonium formate being preferred.

The amount of compound C used can vary within wide proportions. However, the molar ratio of compound C to dicyandiamide is preferably from 1 to 1.5 and most particularly from 1.1 to 1.3. Typically, the reaction mixture comprises from 1 to 10%, preferably from 3 to 8% and most particularly from 6 to 8% by mass of compound C.

The condensation reaction is carried out in an appropriate solvent, water being most particularly preferred.

The amount of solvent in the reaction mixture is chosen so as to obtain the dissolution of the various components. By way of example, the reaction mixture can comprise from 10 to 80% by mass and preferably from 20 to 70% by mass of solvent.

Generally, it is preferable to limit the amount of water in the reaction mixture in order to shift the equilibrium of the condensation reaction towards the desired product. If a diluted product is desired, it is therefore advantageous to add the remaining water after the reaction.

It can be advantageous to add other conventional adjuvants to the polymerizations, for example molecular terminating agents. These compounds make it possible to control the size of the synthesized molecules and thus their molar masses and to thus reduce the polydispersity index of the synthesized molecules. Mention may be made, among appropriate terminating agents, of sulphamic acid.

The condensation reaction takes place rapidly, generally in the space of from approximately 30 minutes to 4 hours. The reaction rate depends on the temperature, which can be between ambient temperature and the boiling point of the reaction mixture. It preferably varies from 20 to 95° C. and preferably from 60 to 95° C. At a lower temperature, the reaction time will be longer. However, a prolonged reaction time at high temperature is undesirable as it may result in the degradation of the product.

Advantageously, the inerting agent for swelling clays is used directly at the end of the reaction, without prior purification. It may thus comprise other products than the expected inerting agent for swelling clays according to the reaction scheme (1) indicated above.

Mixture

The present invention also relates to a mixture to inert non-swelling clays in at least one mineral component intended for the preparation of a hydraulic composition, comprising at least one organic molecule, also known as inerting agent for non-swelling clays, having a cationic charge density of strictly less than 0.5 meq/g and comprising at least two atoms each being capable of forming at least one hydrogen bond. According to an embodiment, the mixture can further comprise an antifoaming agent and/or a biocide.

Preferably, the mixture according to the invention comprises, in addition to the inerting agent for non-swelling clays, at least one superplasticizer.

The present invention also relates to a mixture to inert swelling and non-swelling clays in the mineral component, further comprising, as an agent for swelling clays, a cationic polymer having a cationic charge density greater than 0.5 meq/g and an intrinsic viscosity less than 1 dl/g.

According to an embodiment of the invention, the ratio of the proportion by mass of the inerting agent for non-swelling clays to the proportion by mass of inerting agent for swelling clays is adjusted as a function of the ratio of the proportion by mass of non-swelling clays to the proportion by mass of swelling clays. Preferably, the ratio of the proportion by mass of the inerting agent for non-swelling clays to the proportion by mass of the inerting agent for swelling clays is proportional to the ratio of the proportion by mass of non-swelling clays to the proportion by mass of swelling clays.

According to an embodiment of the invention, the inerting agent for non-swelling clays is water-soluble.

According to an embodiment of the invention, the inerting agent for non-swelling clays is a neutral organic molecule.

According to an embodiment of the invention, the inerting agent for non-swelling clays is a polymer having a molecular weight less than 1 000 000 g/mol, preferably less than 500 000 g/mol, more preferably less than 100 000 g/mol and most preferably less than 50 000 g/mol.

According to an embodiment of the invention, the inerting agent for non-swelling clays comprises at least ten atoms, preferably at least 50 atoms and more preferably at least 100 atoms, each being capable of forming at least one hydrogen bond.

According to an embodiment of the invention, the inerting agent for non-swelling clays is a polymer or a copolymer comprising at least one monomer having at least one atom capable of forming at least one hydrogen bond.

According to an embodiment of the invention, the inerting agent for non-swelling clays is chosen from the group consisting of an oxyalkylene (for example ethylene glycol and/or propylene glycol or PEG), a crown ether, a polyvinyl alcohol, a gluconate, a heptagluconate, a heptagluconic acid, a gluconic acid, a polysaccharide, in particular cellulose or chitin, dextrin, cellulose derivatives, chitosan, alginates, hemicellulose, pectin, polyols or proteins or a mixture of these compounds.

Preferably, the inerting agent for non-swelling clays is a polyvinyl alcohol or PVA. By way of example, PVA is obtained by a partial hydrolysis of a polyvinyl acetate polymer.

According to an embodiment of the invention, the inerting agent for non-swelling clays comprises hydroxyl functional groups.

According to an embodiment of the invention, the inerting agent for swelling clays additionally has a molecular weight expressed by an intrinsic viscosity less than 1 dl/g, preferably less than 0.8 dl/g and more preferably less than 0.6 dl/g.

According to an embodiment of the invention, the polymer is obtained by a stage of polymerization of at least one vinyl acetate monomer or of an analogous compound and a stage of hydrolysis, the degree of hydrolysis of the organic molecule being less than 95%, preferably less than 94% and more preferably less than 93%.

According to an embodiment of the invention, the inerting agent for swelling clays preferably has a linear structure.

Hydraulic Composition

The invention also relates to a hydraulic composition comprising at least one hydraulic binder and at least the mixture as defined above.

Preferably, the hydraulic binder according to the invention is chosen from a cement, plaster or lime. Preferably, the hydraulic binder according to the invention is a cement.

Preferably, the hydraulic composition according to the invention is a cement slurry, a mortar, a concrete, a plaster slurry or a lime slurry. Preferably, the hydraulic composition according to the invention is a cement slurry, a mortar or a concrete.

The present invention also relates to a component for the construction field, produced using a hydraulic composition as defined above.

The present invention also relates to a process for the manufacture of the hydraulic composition as defined above, comprising a stage in which the mixture as defined above is brought into contact with a mixing water and the hydraulic binder.

Treatment

The inerting agent for non-swelling clays or the inerting agent for swelling clays can be used in the solid form (granule, bead), in the liquid form, in the emulsion form or in the suspension form. By way of example, each of these compounds is in the form of an aqueous solution which can comprise, in addition to the active material and the solvent or solvents, in particular at least one conventional adjuvant, for example, a grinding agent, an accelerator, an air-entraining agent, a thickening agent, a retarder, a plasticizer, an anti-shrinkage agent or mixtures thereof. The inerting agent for non-swelling clays or the inerting agent for swelling clays can be in the form of an aqueous solution additionally comprising an antifoaming agent and/or a biocide.

Metering is particularly easy for liquid forms. Furthermore, due to the relatively low molecular weight of the selected macromolecules, it may be possible to use aqueous solutions comprising high concentrations of polymer without problems related to high viscosities. It is particularly advantageous to use high concentrations of polymer in order to reduce costs (transportation, storage). The concentration of polymers in solution can vary but generally varies from 20 to 80% by mass.

By way of example, the inerting agent for non-swelling clays or the inerting agent for swelling clays can be used in the powder form, in order to be mixed dry with the chosen constituent of the hydraulic compositions.

The use of the mixture according to the invention is useful to inert non-swelling and swelling clays present in some constituents of the hydraulic compositions. These non-swelling and swelling clays can affect the properties of the hydraulic compositions, which may or may not comprise superplasticizers.

The content of impurities of the constituent or constituents is not limited, except for economic considerations. For this reason, materials having a content of clay of 0.5 to 5% by mass are generally treated.

The treatment of materials containing clays is particularly easy and fast. This is because the inerting agent for non-swelling clays according to the invention of the inerting mixture has a high affinity for non-swelling clays and the inerting agent for swelling clays of the inerting mixture has a high affinity for swelling clays. Thus, it is sufficient to bring the inerting mixture into contact with the material in order to ensure inerting of the swelling and non-swelling clays comprised in the material. A contacting operation of a few seconds is generally sufficient.

Advantageously, the inerting agent for non-swelling clays according to the invention and the inerting agent for swelling clays are brought into contact with the material to be treated by spraying an aqueous solution comprising the inerting agent for non-swelling clays according to the invention and the inerting agent for swelling clays.

In the case of a particulate material, mixing can be carried out during or after the treatment in order to ensure good distribution of the polymers and to obtain a material which has been homogeneously treated.

Clays are a frequent source of impurities in mineral components for hydraulic compositions, in particular in sands, mineral additions or the hydraulic binder. Consequently, according to an embodiment of the invention, the mineral component is treated with the inerting mixture according to the invention.

Preferably, the mineral component is brought into contact with the inerting mixture by spraying the inerting mixture in aqueous solution over the mineral component.

In order to ensure good distribution of the inerting mixture and to obtain a mineral component which has been homogeneously treated, the mineral component is preferably mixed.

The spraying may take place in a vessel, for example in a baffle box at the outlet of a conveyor belt. In addition, this embodiment ensures a low loss of the product. According to a variant, a solution of the inerting mixture can be sprayed into a mixer placed at the belt outlet. A premix of a small amount of mineral component can be prepared with the inerting mixture, then this premix can be added to the mineral component. A solution of the inerting mixture can be sprayed over the mineral component during the transportation thereof by a conveyor belt.

The inerting mixture is preferably applied to the mineral component in a suitable amount to completely inert the swelling and non-swelling clays present in the mineral component and thus avoiding overdosing of superplasticizer.

However, a partial treatment can be envisaged and the application of a greater amount does not damage the properties desired for the hydraulic composition. Thus, it is not necessary to measure the amount of swelling and non-swelling clays present in the mineral component beforehand in order to determine the necessary amount of the inerting mixture.

Specifically, the amount of the inerting mixture necessary for inerting depends mainly on the content of swelling and non-swelling clays of the mineral component. It can also vary as a function of the nature of the clays present. The treatment of a sand and/or of a mineral addition is generally satisfactory with a dosage of 2 to 20% by mass, preferably of 5 to 10%, of inerting mixture relative to the mass of dry swelling and non-swelling clays in the sand and/or mineral addition.

The inerting mixture can be added to at least one constituent of the hydraulic composition comprising undesirable swelling and non-swelling clays. It can also be added at the moment of the preparation of the hydraulic composition, for example in the mixing water.

The inerting mixture can thus be used in a quarry, in concrete mixing plants, in cement plants, in plants for the production of plaster or in plants for the manufacture of objects made of plaster.

The direct treatment of the mineral components, for example in a sandpit, will, however, generally be more efficient and thus favoured.

The mineral components thus treated can be used conventionally, in particular for the preparation of hydraulic-setting compositions. They are of use in the preparation of hydraulic compositions having uniform properties.

In particular, the mineral components thus treated are useful in the preparation of hydraulic compositions, in which swelling and non-swelling clays may reduce the effectiveness of the superplasticizers.

It is found that this treatment process is highly versatile. This is because it gives highly satisfactory results for different cements, in particular cements with additions, for example pozzolanas or calcareous admixtures.

The hydraulic compositions comprising at least one mineral component comprising swelling and non-swelling clays treated with the inerting mixture have rheological properties comparable to those of compositions prepared with the mineral component devoid of clays, without overdosing with superplasticizer.

The process described makes it possible to treat even highly contaminated mineral components. This is because the described inerting mixture is effective at a low dosage and thus makes the process to inert swelling and non-swelling clays economically viable on the industrial scale.

Finally, the process does not require the installation of specific equipment.

The result of this is that the process described can be effective within a broad range of conditions and for different types of hydraulic compositions and clays.

The invention is described in more detail using the following examples, given without implied limitation.

EXAMPLES

Measurement of the Cationicity of a Cationic Polymer

The cationicity or cationic charge density (in meq/g) represents the amount of charges (in mmol) carried by 1 g of polymer. This property was measured by colloidal titration with an anionic polymer in the presence of a coloured indicator sensitive to the ionicity of the polymer in excess.

In the examples below, the cationicity was determined in the following way.

The following compounds were introduced into a suitable vessel:
60 ml of a 0.001M, pH 6, sodium phosphate buffer solution,
and 1 ml of $4.1 \times 10^{-4}$M o-toluidine blue solution,
then 0.5 ml of solution of cationic polymer to be measured.

This solution was titrated with a solution of potassium polyvinyl sulphate until the indicator changed in colour. The cationicity was obtained by the following relationship:

Cationicity (meq/g)=$(V_{ekpvs} * N_{kpvs})/(V_{cp} * C_{cp})$ in which:
$V_{cp}$ is the volume of solution of the cationic polymer;
$C_{cp}$ is the concentration of cationic polymer in solution;
$V_{ekpvs}$ is the volume of solution of potassium polyvinyl sulphate; and
$N_{kpvs}$ is the normality of the solution of potassium polyvinyl sulphate.

Measurement of the Intrinsic Viscosity of a Polymer

The intrinsic viscosity measurements of the polymers were carried out in a 3M NaCl solution at 25° C. with a capillary viscometer of Ubbelhode type.

The flow time was measured in the capillary tube between two reference points for the solvent and polymer solutions at different concentrations. The specific viscosity was obtained for each concentration by dividing the difference between the flow times of the polymer solution and the solvent by the flow time of the solvent. The reduced viscosity was calculated by dividing the specific viscosity by the concentration of the polymer solution. A line was obtained by plotting the line of the reduced viscosity as a function of the concentration of the polymer solution. The intersection with the y-axis of this line corresponded to the intrinsic viscosity for a concentration equal to zero.

This value was correlated with the average molecular weight of a polymer.

Formulations of the Mortar

TABLE 1

| Formulation (1) of the mortar | |
|---|---|
| Constituent | Mass (g) |
| Cement | 480 |
| Calcareous filler, Betocarb | 359 |
| Sand, PE2LS | 200-X |
| Standard sand | 1350 |
| Clays | X |
| Pre-wetting water | 100.8 |
| Mixing water | 222.4 |
| Adjuvants | 4 |

The cement was a cement of CEM I 52.5N CE CP2 NF type (from Le Havre, Lafarge plant). The filling material (filler) was a calcareous material (Betocarb from Erbray, comprising approximately 90% by mass passing through the 100 μm sieve) (supplier: OMYA). The standard sand was a siliceous sand in accordance with the EN 196.1 Standard (supplier: Société Nouvelle du Littoral). The PE2LS sand was a siliceous sand with a diameter of less than or equal to 0.315 mm (supplier: Fulchiron). The adjuvants comprised a superplasticizer, Glenium 27 (solids content: 20.3% by mass; supplier: BASF). The clays could comprise montmorillonite, kaolinite or a mixture of montmorillonite and kaolinite. The X value represented the total mass in grams of clays.

TABLE 2

| Formulation (2) of the mortar | |
|---|---|
| Constituent | Mass (g) |
| Cement | 405 |
| Sand, PE2LS | 60-X |
| Standard sand | 1350 |
| Clays | X |
| Pre-wetting water | 84.6 |
| Mixing water | 176.8 |
| Adjuvants | 2.5 |

The cement was a cement of CEM I 52.5N CE CP2 NF type (from Le Havre, Lafarge plant). The standard sand was a siliceous sand in accordance with the EN 196.1 Standard (supplier: Société Nouvelle du Littoral). The PE2LS sand was a siliceous sand with a diameter less than or equal to 0.315 mm (supplier: Fulchiron). The adjuvants comprised Chrysoplast CER (dry extract: 24.3% by mass; supplier: Chryso). The clays could comprise montmorillonite, kaolinite or a mixture of montmorillonite and kaolinite. The value X represented the total mass in grams of clays.

Protocol for the Preparation of the Mortars According to Formulation (1) or (2)

A mortar was prepared according to formulation (1) or (2) in the bowl of a Perrier mixer.

The sand was introduced, then the pre-wetting water, and mixing was carried out at low speed (140 rpm) for 1 minute. The mixture was left to rest for 4 minutes before introducing the binders (cement and filler). The moments for measuring the spread of the mortar were timed with respect to the moment of introduction of the binders. The sands used were those shown in formulations (1) and (2). The mixing was taken up again for 1 minute at a low speed and then the mixing water, with the addition of the superplasticizer, was added little by little in 30 seconds. Finally, the mixing was taken up again for a further 2 minutes at 280 rpm.

When the mortar comprised an inerting agent, the latter was added to the sand. The W/C ratio was kept constant for the different series of tests.

Measurement of the Spread of the Mortars According to Formulations (1) and (2)

The spread of the mortar was measured using an Abrams mini-cone, the volume of which was 800 ml. The dimensions of the cone were as follows:
- top diameter: 50+/−0.5 mm;
- bottom diameter: 100+/−0.5 mm; and
- height: 150+/−0.5 mm.

The cone was positioned over a dried glass plate and filled with fresh mortar. It was subsequently levelled flat. Raising the cone brought about slump of the mortar over the glass plate. The diameter of the obtained disc was measured in millimeters +/−5 mm. This corresponded to the spread of the mortar.

Examples A, B, C and D (Comparison Examples)

In order to evaluate the harmful effect of the clays in hydraulic compositions, the levels of workability were compared for a mortar according to formulation (1) or for a mortar according to formulation (2), the mortar being prepared with:
- a clay-free sand (Example A);
- a sand comprising 2% by mass of kaolinite, relative to the mass of sand (clays included) (Example B);
- a sand comprising 2% by mass of montmorillonite, relative to the mass of sand (clays included) (Example C); and
- a sand comprising 2% by mass of kaolinite and 2% by mass of montmorillonite, relative to the mass of sand (clays included) (Example D).

In the continuation of the description, for the mortar according to formulation (1), a spread regarded as sufficient at 5 minutes corresponded to a spread greater than 280 mm and, for the mortar according to formulation (2), a spread regarded as sufficient at 5 minutes corresponded to a spread greater than 180 mm.

The spread at 5 minutes was measured after preparation of the mortar according to formulation (1) and of the mortar according to formulation (2). The results are collated in Table 3 below. The inventors found first of all that the clays had a harmful effect on the spread since a sufficient spread at 5 minutes was not obtained. These tests furthermore showed that kaolinite had a harmful effect, although less pronounced than montmorillonite.

Example 1

The inerting agent for swelling clays used for Examples 1 to 3 was an epichlorohydrin/dimethylamine polyamine having a cationicity of 7.3 meq/g and an intrinsic viscosity of 0.04 dl/g (FL2250; dry extract: 54.5% by mass; supplier: SNF).

Subsequently, a mortar was prepared according to formulation (1) with 2% by mass of kaolinite, relative to the mass of sand (clays included). In addition, 98.2 g of pre-wetting water was used and 5.69 g of the cationic polymer obtained (in solution at a dry extract content of 54.5%) was added after the pre-wetting water, that is to say that 10% by mass of dry cationic polymer was added, relative to the mass of clays.

Subsequently, a mortar was prepared according to formulation (2) with 2% by mass of kaolinite, relative to the mass of sand (clays included). In addition, 82.2 g of pre-wetting water was used and 5.17 g of the cationic polymer obtained (in solution at a dry extract content of 54.5%) was added after the pre-wetting water, that is to say that 10% by mass of dry cationic polymer was added, relative to the mass of clays.

The spread was measured at 5 minutes after preparation of the mortar. A sufficient spread at 5 minutes was obtained with a dosage of 10% by mass of cationic polymer FL2250, calculated as dry polymer, relative to the mass of clay (kaolinite).

The results of the preceding tests A, B, C and D and the preceding Example 1 and the results of the following Examples 2 to 9 are collated in Table 3 below.

TABLE 3

| Example (1) | Dosage of inerting agent for swelling clays (% by mass dry polymer/mass clays) | Dosage of inerting agent for non-swelling clays (% by mass dry polymer/mass clays) | Spread at 5 min (mm) Formulation (1) | Spread at 5 min (mm) Formulation (2) | Clay (% by mass/mass of sand, clays included) |
|---|---|---|---|---|---|
| A | — | — | 320 | 220 | — |
| B | — | — | 170 | 180 | 2% kaolinite |
| C | — | — | 100 | 130 | 2% montmorillonite |
| D | — | — | 100 | 105 | 2% montmorillonite + 2% kaolinite |
| 1 | 10 | — | 305 | 195 | 2% kaolinite |
| 2 | 10 | — | 315 | 210 | 2% montmorillonite |
| 3 | 10 | — | 260 | 185 | 2% montmorillonite + 2% kaolinite |
| 4 | — | 10 | 305 | 190 | 2% kaolinite |
| 5 | — | 10 | 260 | 190 | 2% montmorillonite |
| 6 | — | 10 | 200 | 165 | 2% montmorillonite + 2% kaolinite |
| 7 | 5 | 5 | 300 | 180 | 2% montmorillonite + 2% kaolinite |
| 8 | 3 | 3 | 285 | 180 | 2% montmorillonite + 2% kaolinite |
| 9 | 2.5 | 7.5 | 280 | 160 | 2% montmorillonite + 2% kaolinite |

TABLE 3-continued

| Example (1) | Dosage of inerting agent for swelling clays (% by mass dry polymer/mass clays) | Dosage of inerting agent for non-swelling clays (% by mass dry polymer/mass clays) | Spread at 5 min (mm) Formulation (1) | Spread at 5 min (mm) Formulation (2) | Clay (% by mass/mass of sand, clays included) |
|---|---|---|---|---|---|
| 10 | 1.5 | 4.5 | 255 | 150 | 2% montmorillonite + 2% kaolinite |
| 11 | — | 10 | 310 | 190 | 2% kaolinite |
| 12 | — | 10 | 270 | 175 | 2% kaolinite |
| 13 | — | 10 | 300 | 190 | 2% kaolinite |
| 14 | 5 | 5 | 325 | 200 | 2% kaolinite |
| 15 | 5 | 5 | 335 | 185 | 2% montmorillonite |
| 16 | 5 | 5 | 290 | 195 | 2% montmorillonite + 2% kaolinite |
| 17 | 5 | 5 | 355 | 230 | 2% kaolinite |
| 18 | 5 | 5 | 375 | 195 | 2% montmorillonite |
| 19 | 5 | 5 | 350 | 190 | 2% montmorillonite + 2% kaolinite |

Example 2

Example 1 was repeated, the kaolinite added to the sand being replaced with montmorillonite. It was found that the spread at 5 minutes of the clay-free mortar was reached with a dosage of 10% by mass of cationic polymer, FL2250, calculated as dry polymer, relative to the mass of clays (montmorillonite). The spread at 5 minutes obtained with the inerting agent for swelling clays was greater when the clay was montmorillonite in comparison with kaolinite.

Example 3

Example 1 was repeated by adding 2% by weight of montmorillonite and 2% by mass of kaolinite, relative to the mass of sand (clays included). The inventors found that the spread at 5 minutes of the mortar obtained with a dosage of 10% by mass of cationic polymer, FL2250, calculated as dry polymer, relative to the mass of clays (montmorillonite and kaolinite), was not sufficient for the mortar according to formulation (1) and was just sufficient for the mortar according to formulation (2).

Example 4

The inerting agent for non-swelling clays used for Examples 4 to 6 was a polyvinyl alcohol (Mowiol 4-88; dry extract: 19.8% by mass; manufacturer: Kuraray) obtained by partial hydrolysis of polyvinyl acetate and characterized by a degree of hydrolysis of 88% and a viscosity, in a 4% solution and at 20° C., of 4 mPa·s (measured according to the DIN 53015 Standard). In Example 4 and in the examples which follow, when the inerting agent for non-swelling clays was a polyvinyl alcohol, an antifoaming agent was added to the mortar prepared according to formulation (1) or (2) (2.5% by mass, relative to the mass on a dry basis of polyvinyl alcohol).

A mortar was prepared according to formulation (1) with 2% by mass of kaolinite, relative to the mass of sand (clays included). In addition, 88.2 g of pre-wetting water were used and 15.7 g of the inerting agent for non-swelling clays (in solution at a dry extract content of 19.8%) were added after the pre-wetting water, that is to say that 10% by mass of the dry inerting agent for non-swelling clays was added, relative to the mass of clays.

A mortar was prepared according to formulation (2) with 2% by mass of kaolinite, relative to the mass of sand (clays included). In addition, 73.2 g of pre-wetting water were used and 14.2 g of the inerting agent for non-swelling clays (in solution at a dry extract content of 19.8%) were added after the pre-wetting water, that is to say that 10% by mass of the dry inerting agent for non-swelling clays was added, relative to the mass of clays.

The spread was measured at 5 minutes after preparation of the mortar. A sufficient spread of the mortar was obtained at 5 minutes with a dosage of 10% by weight of inerting agent for non-swelling clays, calculated as dry polymer, relative to the weight of clay (kaolinite).

Example 5

Example 4 was repeated, the kaolinite added to the sand being replaced with montmorillonite. It was found that the spread at 5 minutes of the mortar with a dosage of 10% by weight of inerting agent for non-swelling clays, Mowiol 4-88, calculated as dry polymer, relative to the weight of clay (montmorillonite), was not sufficient for the mortar according to formulation (1) and was sufficient for the mortar according to formulation (2).

Example 6

Example 4 was repeated by adding 2% by weight of montmorillonite and 2% by weight of kaolinite, relative to the weight of sand (clays included). The inventors found that the spreading at 5 minutes of the mortar with a dosage of 10% by weight of inerting agent for non-swelling clays, Mowiol 4-88, calculated as dry polymer, relative to the weight of clay (montmorillonite and kaolinite), was not sufficient.

Example 7

For Examples 7 to 10, the inerting agent for swelling clays was FL2250 and the inerting agent for non-swelling clays was Mowiol 4-88.

A mortar was prepared according to formulation (1) with 2% by weight of kaolinite and 2% by weight of montmorillonite, relative to the weight of the sand (clays included). In addition, 85.6 g of pre-wetting water were used and 5.69 g of the FL2250 polymer obtained (in solution at a dry extract content of 54.5%) and 15.7 g of the Mowiol 4-88 polymer obtained (in solution at a dry extract content of 19.8%) were added after the pre-wetting water, that is to say that 5% by weight of dry inerting agent for swelling clays, relative to the weight of the clay, was added and 5% by weight of dry inerting agent for non-swelling clays, relative to the weight of the clay, was added.

A mortar was prepared according to formulation (2) with 2% by weight of kaolinite and 2% by weight of montmorillonite, relative to the weight of the sand (clays included). In addition, 70.7 g of pre-wetting water were used and 5.17 g of the FL2250 polymer obtained (in solution at a dry extract content of 54.5%) and 14.2 g of the Mowiol 4-88 polymer obtained (in solution at a dry extract content of 19.8%) were added after the pre-wetting water, that is to say that 5% by weight of dry inerting agent for swelling clays, relative to the weight of the clay, was added and 5% by weight of dry inerting agent for non-swelling clays, relative to the weight of the clay, was added.

The spread was measured at 5 minutes after the preparation of the mortar. A sufficient spread at 5 minutes was obtained with dosages of 5% by weight of the FL2250 polymer and 5% by weight of the Mowiol 4-88 polymer, calculated as dry polymer, relative to the weight of clay (montmorillonite and kaolinite).

Example 8

Example 7 was repeated using 3% of the FL2250 inerting agent for swelling clays, and 3% of the Mowiol 4-88 inerting agent for non-swelling clays. A sufficient spread at 5 minutes was obtained with dosages of 3% by weight of the FL2250 polymer and 3% by weight of the Mowiol 4-88 polymer, calculated as dry polymer, relative to the weight of the clay (montmorillonite and kaolinite).

Example 9

Example 7 was repeated using 2.5% of the FL2250 polymer and 7.5% of the Mowiol 4-88 polymer. A sufficient spread at 5 minutes was obtained for the mortar according to formulation (1) and an insufficient spread at 5 minutes was obtained for the mortar according to formulation (2) with dosages of 2.5% by weight of the FL2250 polymer and 7.5% by weight of the Mowiol 4-88 polymer, calculated as dry polymer, relative to the weight of the clay (montmorillonite and kaolinite).

Example 10

Example 7 was repeated using 1.5% of the FL2250 polymer and 4.5% of the Mowiol 4-88 polymer. An insufficient spread at 5 minutes was obtained with dosages of 1.5% by weight of the FL2250 polymer and 4.5% by weight of the Mowiol 4-88 polymer, calculated as dry polymer, relative to the weight of clay (montmorillonite and kaolinite).

Example 11

The inerting agent for non-swelling clays used for Example 11 was a polyvinyl alcohol (Mowiol 8-88; dry extract: 8.8% by mass; manufacturer: Kuraray) obtained by partial hydrolysis of polyvinyl acetate and characterized by a degree of hydrolysis of 88% and a viscosity, in a 4% solution at 20° C., of 4 mPa·s (measured according to the DIN 53015 Standard).

Subsequently, a mortar was prepared according to formulation (1) with 2% by weight of kaolinite, relative to the weight of sand (clays included). In addition, 68.5 g of pre-wetting water were used and 35.3 g (in solution at a dry extract content of 8.8%) of the Mowiol 8-88 polymer obtained were added after the pre-wetting water, that is to say that 10% by weight of dry polymer was added, relative to the weight of the clay.

Subsequently, a mortar was prepared according to formulation (2) with 2% by weight of kaolinite, relative to the weight of sand (clays included). In addition, 55.4 g of pre-wetting water were used and 32.0 g (in solution at a dry extract content of 8.8%) of the Mowiol 8-88 polymer obtained were added after the pre-wetting water, that is to say that 10% by weight of dry polymer was added, relative to the weight of the clay.

The spread was measured at 5 minutes after preparation of the mortar. The inventors found that a sufficient spread of the mortar at 5 minutes was obtained with a dosage of 10% by weight of the Mowiol 8-88 polymer, calculated as dry polymer, relative to the weight of clay (kaolinite).

Example 12

The inerting agent for non-swelling clays used for Example 12 was a polyvinyl alcohol (Mowiol 10-98; dry extract: 13.7% by mass; manufacturer: Kuraray) obtained by partial hydrolysis of polyvinyl acetate having a degree of hydrolysis of 98% and a viscosity, in a 4% solution and at 20° C., of 10 mPa·s (measured according to the DIN 53015 Standard).

Subsequently, a mortar was prepared according to formulation (1) with 2% by weight of kaolinite, relative to the weight of sand (clays included). In addition, 78.5 g of pre-wetting water were used and 25.4 g of the Mowiol 10-98 polymer obtained (in solution at a dry extract content of 12.2%) were added after the pre-wetting water, that is to say that 10% by weight of dry polymer was added, relative to the weight of the clay.

Subsequently, a mortar was prepared according to formulation (2) with 2% by weight of kaolinite, relative to the weight of sand (clays included). In addition, 64.3 g of pre-wetting water were used and 23.1 g of the Mowiol 10-98 polymer obtained (in solution at a dry extract content of 12.2%) were added after the pre-wetting water, that is to say that 10% by weight of dry polymer was added, relative to the weight of the clay.

The spread was measured at 5 minutes after preparation of the mortar. It was found that an insufficient spread of the mortar was obtained at 5 minutes with a dosage of 10% by weight of the polymer Mowiol 10-98, calculated as dry polymer, relative to the weight of the clay (kaolinite).

Example 13

The inerting agent for non-swelling clays used for Example 13 was a polyvinyl alcohol (Mowiol 18-88; dry extract: 13.7% by mass; manufacturer: Kuraray) obtained by partial hydrolysis of polyvinyl acetate and characterized by a degree of hydrolysis of 88% and a viscosity, in a 4% solution and at 20° C., of 18 mPa·s (measured according to the DIN 53015 Standard).

Subsequently, a mortar was prepared according to formulation (1) with 2% by weight of kaolinite, relative to the weight of sand (clays included). In addition, 81.1 g of pre-wetting water were used and 22.7 g of the Mowiol 18-88 polymer obtained (in solution at a dry extract content of 13.7%) were added after the pre-wetting water, that is to say that 10% by weight of dry polymer was added, relative to the weight of the clay.

Subsequently, a mortar was prepared according to formulation (2) with 2% by weight of kaolinite, relative to the weight of sand (clays included). In addition, 66.8 g of pre-wetting water were used and 20.7 g of the polymer Mowiol 18-88 (in solution at a dry extract content of 13.7%) obtained were added after the pre-wetting water, that is to say that 10% by weight of dry polymer was added, relative to the weight of the clay.

The spread was measured at 5 minutes after preparation of the mortar. The inventors found that a sufficient spreading of the mortar at 5 minutes was obtained with a dosage of 10% by weight of the polymer Mowiol 18-88, calculated as dry polymer, relative to the weight of the clay (kaolinite).

Example 14

The inerting agent for swelling clays used for Examples 14, 15 and 16 was obtained by polycondensation of dicyandiamide/formaldehyde quaternized with ammonium formate (DF; dry extract content: 53.4% by mass). The inerting agent for non-swelling clays used for Examples 14, 15 and 16 was Mowiol 4-88.

A mortar was prepared according to formulation (1) with 2% by weight of kaolinite, relative to the weight of sand (clays included). In addition, 93.1 g of pre-wetting water were used and 2.9 g (in solution at a dry extract content of 53.4%) of the DF polymer obtained and 7.8 g of the Mowiol 4-88 polymer obtained (in solution at a dry extract content of 19.8%) were added after the pre-wetting water, that is to say that 5% by weight of the inerting agent for swelling clays, calculated as dry polymer, relative to the weight of clay, and 5% by weight of the inerting agent for non-swelling clays, calculated as dry polymer, relative to the weight of the clay, were added.

A mortar was prepared according to formulation (1) with 2% by weight of kaolinite, relative to the weight of sand (clays included). In addition, 77.6 g of pre-wetting water were used and 2.62 g (in solution at a dry extract content of 53.4%) of the DF polymer obtained and 7.1 g of the Mowiol 4-88 polymer obtained (in solution at a dry extract content of 19.8%) were added after the pre-wetting water, that is to say that 5% by weight of the inerting agent for swelling clays, calculated as dry polymer, with respect to the weight of clay, and 5% by weight of the inerting agent for non-swelling clays, calculated as dry polymer, relative to the weight of the clay, were added.

The spread was measured at 5 minutes after preparation of the mortar. A sufficient spread at 5 minutes was obtained with dosages of 5% by weight of the DF polymer and 5% by weight of the Mowiol 4-88 polymer, calculated as dry polymer, relative to the weight of the clay (kaolinite).

Example 15

Example 14 was repeated, the kaolinite added to the sand being replaced with montmorillonite. A sufficient spread at 5 minutes was obtained with dosages of 5% by weight of the DF polymer and 5% by weight of the Mowiol 4-88 polymer, calculated as dry polymer, relative to the weight of the clay (montmorillonite).

Example 16

Example 14 was repeated by adding 2% by weight of montmorillonite and 2% by weight of kaolinite, relative to the weight of the sand (clays included). A sufficient spread at 5 minutes was obtained with dosages of 5% by weight of the DF polymer and 5% by weight of the Mowiol 4-88 polymer, calculated as dry polymer, relative to the weight of the clay (montmorillonite and kaolinite).

Example 17

The inerting agent for swelling clays used for Examples 17, 18 and 19 was a polyDADMAC (polymer obtained by polycondensation of diallyldimethylammonium chloride). The inerting agent for swelling clays had a cationicity of 6.2 meq/g (polyDADMAC TS45RD (in the powder form); dry extract: 90% by mass; supplier: SNF). The inerting agent for non-swelling clays used for Examples 17, 18 and 19 was Mowiol 4-88.

A mortar was prepared according to formulation (1) with 2% by weight of kaolinite, relative to the weight of sand (clays included). In addition, 94.3 g of pre-wetting water was used and 1.7 g of the Polydadmac polymer obtained and 7.8 g of the Mowiol 4-88 polymer obtained were added after the pre-wetting water, that is to say that 5% by weight of the inerting agent for swelling clays, calculated as dry polymer, relative to the weight of the clay, and 5% by weight of the inerting agent for non-swelling clays, calculated as dry polymer, relative to the weight of the clay, were added.

A mortar was prepared according to formulation (2) with 2% by weight of kaolinite, relative to the weight of sand (clays included). In addition, 78.6 g of pre-wetting water was used and 1.57 g of the polymer Polydadmac obtained and 7.1 g of the polymer Mowiol 4-88 obtained were added after the pre-wetting water, that is to say that 5% by weight of the inerting agent for swelling clays, calculated as dry polymer, relative to the weight of the clay, and 5% by weight of the inerting agent for non-swelling clays, calculated as dry polymer, relative to the weight of the clay, were added.

The spread was measured at 5 minutes after preparation of the mortar. A sufficient spread at 5 minutes was obtained with dosages of 5% by weight of the Polydadmac polymer and 5% by weight of the Mowiol 4-88 polymer, calculated as dry polymer, relative to the weight of the clay (kaolinite).

Example 18

Example 17 was repeated, the kaolinite added to the sand being replaced with montmorillonite. A sufficient spread at 5 minutes was obtained with dosages of 5% by weight of the Polydadmac polymer and 5% by weight of the Mowiol 4-88 polymer, calculated as dry polymer, relative to the weight of the clay (montmorillonite).

Example 19

Example 17 was repeated by adding 2% by weight of montmorillonite and 2% by weight of kaolinite, relative to the weight of the sand (clays included). A sufficient spreading at 5 minutes was obtained with dosages of 5% by weight of the Polydadmac polymer and 5% by weight of the Mowiol 4-88 polymer, calculated as dry polymer, relative to the weight of the clay (montmorillonite and kaolinite).

The invention claimed is:

1. A process to prepare a hydraulic composition comprising a mineral component in which non-swelling clays are inerted, comprising the steps of:
   a. preparing an aqueous composition comprising an organic molecule, wherein the organic molecule has a cationic charge density of strictly less than 0.5 meq/g and comprising at least two atoms that are each capable of forming at least one hydrogen bond, wherein the organic molecule is obtained by a stage of polymerization of at least one vinyl acetate monomer and a stage of hydrolysis, a degree of hydrolysis of the organic molecule being less than 93%, and b. adding the aqueous composition obtained in step a) to the mineral component including non-swelling clays, the mineral component having a content of clay of 0.5 to 5% by mass, the mineral component being present in a constituent of the hydraulic composition.

2. The process according to claim 1, wherein the organic molecule is neutral.

3. The process according to claim 1, wherein the organic molecule is a polyvinyl alcohol.

4. The process according to claim 1, wherein the hydraulic composition is a concrete or a mortar.

5. A mixture to inert non-swelling clays in at least one mineral component intended for the preparation of a hydraulic composition, comprising:

an organic molecule wherein the organic molecule has a cationic charge density of strictly less than 0.5 meq/g and comprises at least two atoms that are each capable of forming at least one hydrogen bond, and wherein the organic molecule is obtained by a stage of polymerization of at least one vinyl acetate monomer and a stage of hydrolysis, a degree of hydrolysis of the organic molecule being less than 93%, an inerting agent for swelling clays and a superplasticizer, said organic molecule, said inerting agent for swelling clays and said superplasticizer being the main polymers in the mixture, and an antifoaming agent, a biocide or both an antifoaming agent and a biocide.

6. The mixture according to claim 5, wherein the organic molecule is neutral.

7. The mixture according to claim 5, to inert swelling and non-swelling clays in the mineral component, further comprising a cationic polymer having a cationic charge density greater than 0.5 meq/g and an intrinsic viscosity less than 1 dl/g.

8. The mixture according to claim 5, wherein the organic molecule is a polyvinyl alcohol.

9. A process for the production of a hydraulic composition, comprising bringing into contact the mixture according to claim 5 with a mixing water and hydraulic binder.

10. The process according to claim 1, wherein the mineral component is sand, a mineral addition, a hydraulic binder or any combination thereof.

11. The process according to claim 10, wherein the mineral addition is fly ash, a pozzolanic material, silica fume, a slag, calcined shale, a calcareous addition, a siliceous addition or any combination thereof.

12. The process according to claim 10, wherein the hydraulic binder is cement or plaster.

13. The process according to claim 5, wherein the mineral component is sand, a mineral addition, a hydraulic binder or any combination thereof.

14. A process to prepare a hydraulic composition comprising a mineral component in which swelling and non-swelling clays are inerted, comprising the steps of a. preparing an aqueous composition comprising an organic molecule, wherein the organic molecule has a cationic charge density of strictly less than 0.5 meq/g and comprising at least two atoms that are each capable of forming at least one hydrogen bond, wherein the organic molecule is obtained by a stage of polymerization of at least one vinyl acetate monomer and a stage of hydrolysis, a degree of hydrolysis of the organic molecule being less than 93%;

b. preparing a composition comprising a cationic polymer, wherein the cationic polymer has a cationic charge density greater than 0.5 meq/g and an intrinsic viscosity less than 1 dl/g, and c. adding the aqueous composition obtained in step a) and the composition obtained in step b) to, the mineral component including swelling clays and non-swelling clays, the mineral component having a content of clay of 0.5 to 5% by mass, the mineral component being present in a constituent of the hydraulic composition.

15. The process according to claim 14, wherein the organic molecule having a cationic charge density of strictly less than 0.5 meq/g is a polyvinyl alcohol.

16. The process according to claim 1, wherein the aqueous composition is sprayed on the mineral component including non-swelling clays.

17. The process according to claim 1, wherein the hydraulic composition further comprises a superplasticizer.

18. The mixture according to claim 5, wherein the mixture is an aqueous composition.

19. The process according to claim 14, wherein the hydraulic composition further comprises a superplasticizer.

20. The process according to claim 14, wherein the intrinsic viscosity is less than 0.6 dl/g.

* * * * *